R. C. COWLEY.
CULTIVATOR BEAM.
APPLICATION FILED AUG. 2, 1916.
1,231,241.
Patented June 26, 1917.
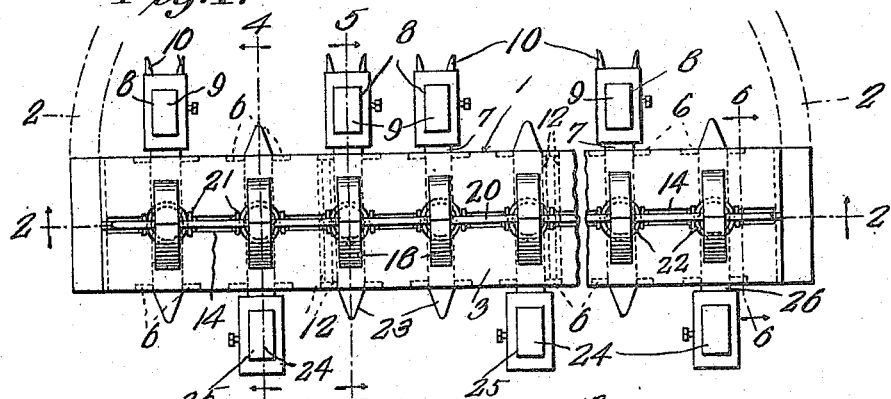
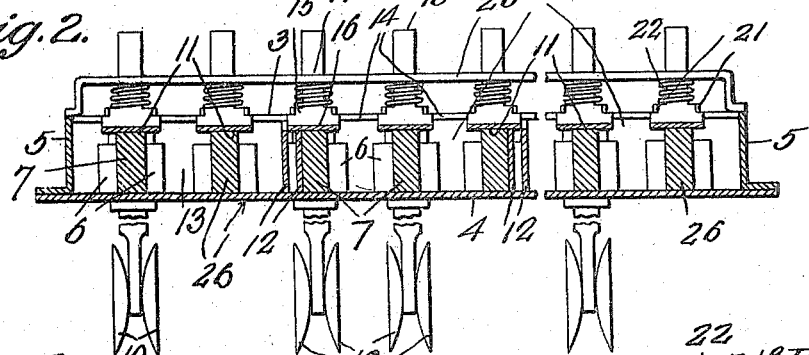
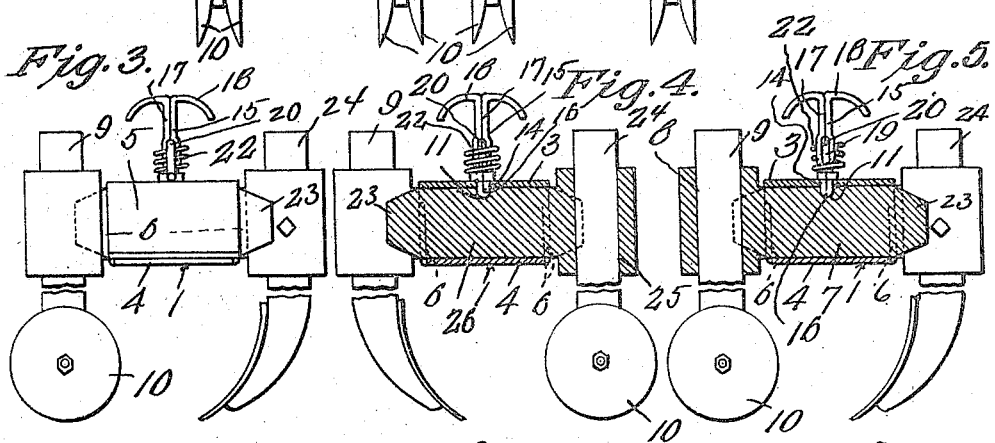
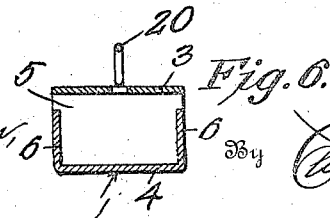
Witnesses
James F. Crown
Inventor
R. C. Cowley,
By
Attorneys

UNITED STATES PATENT OFFICE.

RAY C. COWLEY, OF VENICE, UTAH.

CULTIVATOR-BEAM.

1,231,241.  Specification of Letters Patent.  Patented June 26, 1917.

Application filed August 2, 1916. Serial No. 112,774.

*To all whom it may concern:*

Be it known that I, RAY C. COWLEY, a citizen of the United States, residing at Venice, in the county of Sevier, State of Utah, have invented certain new and useful Improvements in Cultivator-Beams; and I do hereby declare the following to be a full, clear, and exact description of the invention, such as will enable others skilled in the art to which it appertains to make and use the same.

The present invention is directed to improvements in beams for cultivators, and has for its object to provide a device of this character constructed in such a manner that the weeding plows and digging plows can be readily attached and detached, as desired.

A further object of the invention is to provide an attachment so constructed that the cutting blades carried thereby can be conveniently adjusted transversely of the cultivator and held in positive adjusted positions.

With these and other objects in view, this invention resides in the novel features of construction, formation, combination and arrangement of parts to be hereinafter more fully described, claimed and illustrated in the accompanying drawing, in which:—

Figure 1 is a fragmentary plan view of the beam.

Fig. 2 is a sectional view on line 2—2 of Fig. 1.

Fig. 3 is an end view.

Fig. 4 is a sectional view on line 4—4 of Fig. 1.

Fig. 5 is a sectional view on line 5—5 of Fig. 1.

Fig. 6 is a sectional view on line 6—6 of Fig. 1.

Referring to the drawing 1 designates the beam, and 2 designates the side frames of a cultivator, said beam comprising upper and lower bars 3 and 5, respectively, the ends of the upper bar terminating in downwardly extending flanges 5 which are attached in any suitable manner to the ends of the bar 4, whereby said bars are held in spaced vertical relation.

The longitudinal edges of the bar 5 are provided with spaced uprights 6, which are disposed vertically and spaced a sufficient distance apart to receive therebetween the arms 7, said arms having sockets 8 formed upon their rear ends for adjustably receiving the standards 9 of the weed cutters 10, which may be of any desired construction, said arms having grooves 11 formed in their upper edges, the purpose of which will appear later.

The bar 4 has supported thereby, brace plates 12 which divide the spaces between the plates 3 and 4 into compartments 13. The bar 3 is provided with slots 14 which coincide with the respective compartments 13 and in which slide the heads 15 of the latches 16, said latches being formed from single pieces of sheet metal and bent upon themselves to provide shanks 17, and handles 18, the handles being spaced, as at 19 for slidably engaging the guide bar 20, which is supported by the bar 3 and spaced vertically therefrom.

To limit the downward movement of the heads 15 of the latches, the heads are provided with projections 21.

Surrounding the shanks 17 of the latches are coil springs 22, which have their upper ends engaged with the guide bar 20 and their lower ends engaged with the heads 15, said springs serving to normally hold the heads engaged in the grooves 12 formed in the arms 7.

When it is desired to adjust the arms 7 transversely of the cultivator, it is only necessary to actuate the latches to permit removal of the arms from between one set of the uprights 6 and to replace the same between another set, after which the latch is slid so as to be in a position to engage the groove 11, thereby holding the arm against longitudinal and transverse movement.

It will be noted that the inner ends of the arms 7 are beveled, as at 23, whereupon the beveled end will automatically raise the latches when the arms are forced in between the plates 3 and 4.

The shovel standards 24 are engaged in the sockets 25 carried by the rear ends of the arms 26, and since these shanks are identical in construction to the arms 7 a detailed description thereof is not thought necessary.

From the foregoing description it will be seen that the arms 7 and 26 can be adjusted longitudinally of the beam as desired.

What is claimed is:—

1. A cultivator beam consisting of upper and lower bars, latches slidably associated with the beam, arms engageable between said bars and detachably engaged by the latches, and standards adjustably connected with certain ends of said arms.

2. A cultivator beam, comprising upper and lower bars, the lower bar having its longitudinal edges provided with spaced vertical uprights, arms removably engaged between the standards and upper and lower bars, a guide bar supported longitudinally of the bar, latches slidably and yieldably associated with the guide bar, said beam having a longitudinal slot formed in its upper bar, said latches being slidably engaged in the slots and detachably engaged with the arms, said arms having sockets on certain of their ends for adjustably supporting the standards.

In testimony whereof, I affix my signature, in the presence of two witnesses.

RAY C. COWLEY.

Witnesses:
 JENNIE COWLEY,
 E. A. COWLEY.

Copies of this patent may be obtained for five cents each, by addressing the "Commissioner of Patents, Washington, D. C."